Patented Jan. 29, 1946

2,393,925

UNITED STATES PATENT OFFICE 2,393,925

INSECTICIDES

Rupert C. Morris and Edward C. Shokal, Oakland, Calif., and William S. Thornhill, Plainfield, N. J., assignors to Shell Development Company, San Francisco, Calif., a corporation of Delaware No Drawing. Application January 26, 1943, Serial No. 474,032

14 Claims. (Cl. 167—33)

This invention deals with a new insecticide of great utility, and is particularly concerned with toxic substances suitable for use in household insecticides. Among the best known and used toxicants for such purposes at present are pyrethrum and rotenone. These are both derived from plants grown in foreign countries and are therefore expensive and not always obtainable in desired quantities.

It is an object of the present invention to provide an insecticide which can be readily manufactured from readily available domestic and inexpensive materials. It is a further object of this invention to provide a very toxic, moderately fast-acting insecticide which is little if at all toxic to man and other warm-blooded animals. Another object is to provide a synthetic toxicant which is stable toward light and which is compatible with plant toxics. A still further object is to provide a synthetic toxicant which has the property of solutizing rotenone in mineral spray oils. Other and further objects will be apparent from reading the specification.

We have now discovered that certain derivatives of cyclic sulfones may be utilized in insecticides to accomplish one or more of the foregoing objects. Our cyclic sulfone derivatives have a saturated five-membered ring composed of four carbon atoms and one sulfone group, i. e. cyclotetramethylene sulfone, and are know as sulfolanes. These sulfolane compounds may be defined by the following formula:

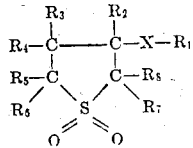

wherein X stands for a member of the group consisting of O and S. The symbol $R_1$ represents an alkyl, alkenyl, aralkyl, aryl, acyl, alicyclic, or heterocyclic radical. Examples of such radicals are methyl, ethyl, propyl, isopropyl, normal butyl, isobutyl, secondary butyl, tertiary butyl, normal pentyl, isopentyl, secondary pentyl, hexyl, normal octyl, iso-octyl, normal decyl, isodecyl, dodecyl, tetradecyl, cetyl, stearyl, trimethyl octodecyl, allyl methallyl, crotyl, methyl vinyl carbinyl, butenyl, pentenyl, hexenyl, propargyl, geranyl, oleyl, phenyl, naphthyl, anthryl, tolyl, xylyl, secondary butyl-naphthyl, dipropyl-naphthyl, benzyl, naphthyl-butyl, phenetyl, vinyl-phenyl, crotonyl-naphthyl, methallyl-phenyl, triallyl-naphthyl, naphthylallyl, 2-phenyl-ethenyl, phenyl vinyl carbinyl, cinnamyl, acetyl, propionyl, caproyl, stearacyl, benzoyl, cyclopentyl, ethyl-cyclohexyl, tributyl-cyclohexyl, cyclopentenyl, cyclohexenyl, vinyl cyclohexenyl, thioenyl, pyrrolyl, pyridyl, furyl, butyl carbothionyl, octyl carbothionyl, decyl carbothionyl, etc. Further, these radicals may be substituted with other elements or groups as halogen, hydroxyl, amino, nitro, carbonyl, sulfo, cyano, etc. For example, such substituted radicals may be chlorobutyl, bromo-octyl, nitroethyl, hydroxycyclohexyl, nitrobenzyl, chlorallyl, chlorobenzoyl, tetrahydrofurfuryl, hydroxyethyl, dihydro-isophoryl, sulfo-ethyl, benzene sulfonyl, cyanoacetyl, etc. The symbols $R_2$, $R_3$, $R_4$, $R_5$, $R_6$, $R_7$ and $R_8$ represent the same or different atoms or groups such as hydrogen atoms, halogen atoms, or organic radicals which are preferably hydrocarbon radicals such as those set out in the foregoing.

Compounds of the above formula wherein X stands for O and $R_1$ stands for an aliphatic radical containing from 5 to 20 carbon atoms, and there are 10 or less carbon atoms among $R_2$ to $R_8$, are especially effective for our purpose. A preferred group of these compounds are those wherein $R_2$ to $R_8$ are all hydrogen.

As examples of particular compounds which may be used in the insecticidal and parasiticidal compositions of the present invention, the following may be mentioned: n-decyl ether of 3-hydroxy thiolane-1,1-dioxide; cetyl ether of 3-hydroxy thiolane - 1,1 - dioxide; dihydroisophoral ether of 3-hydroxy thiolane-1,1-dioxide; caproic acid ester of 3-hydroxy thiolane-1,1-dioxide; tertiary butyl ether of 3-thiohydroxy thiolane-1,1-dioxide; tetrahydro furfuryl ether of 3-hydroxy thiolane-1,1-dioxide; methyl ether of 3-hydroxy thiolane-1,1-dioxide; acetic acid ester of 3-hydroxy thiolane-1,1-dioxide; isoamyl ether of 3-thiohydroxy thiolane-1,1-dioxide; methyl ether of 3-hydroxy 4-methyl thiolane-1,1-dioxide; decyl ether of 3-hydroxy 4-methyl thiolane-1,1-dioxide; methallyl ether of 3-thiohydroxy thiolane-1,1-dioxide; isohexyl ether of 3-hydroxy thiolane-1,1-dioxide; allyl ether of 3-hydroxy thiolane-1,1-dioxide; cyano-acetic acid ester of 3-hydroxy thiolane-1,1-dioxide; 2-chlorallyl ether of 3-hydroxy thiolane-1,1-dioxide; cyclopentenyl ether of 3-hydroxy-4-chlorothiolane-1,1-dioxide; cyclohexyl ether of 3-hydroxy thiolane-1,1-dioxide; methyl vinyl carbinyl ether of 3-hydroxy thiolane-1,1-dioxide; benzyl ether of 3-thiohydroxy thiolane-1,1-dioxide; as well as compounds such as are representable by the formulae:

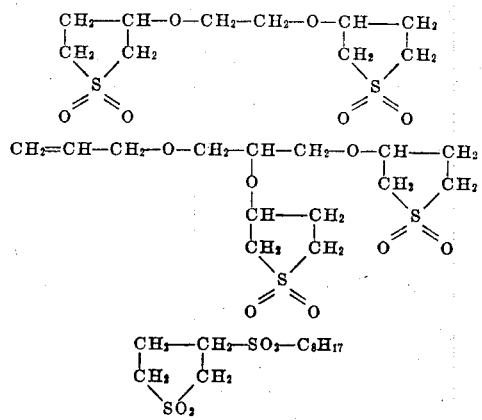

and others.

The starting materials for the compounds of the invention are reaction products of conjugated diene hydrocarbons (including halogenated diene hydrocarbons such as chloroprene, for example) with sulfur dioxide. The preparation of such unsaturated cyclic sulfones is described in British Patent 361,341, German Patent 236,386, German Patent 506,839, and by Backer and Strating in Rec. trav. chim. 53, 525–543 (1934).

The unsaturated cyclic sulfones so prepared may be reacted with ROH and RSH generally in the presence of KOH to produce the cyclic sulfone ethers and cyclic sulfone thioethers of the invention. Esters are preferably prepared by first reacting the unsaturated cyclic sulfones with water to form the alcohol and then esterifying with a suitable acid. These compounds may likewise be termed ethers, esters and thioethers of 3-hydroxy thiolane-1,1-dioxide or of 3-hydroxy cyclotetramethylene sulfone or of sulfalanol.

The following is an example of preparing a compound in accordance with our invention:

To a solution of about 20 parts of potassium hydroxide in 1000 parts of n-decanol is slowly added about 1000 parts of 3-thiolene-1,1-dioxide ($\beta$-butadiene sulfone) in portions with stirring, the temperature being kept below 30° C. by cooling. When the addition was complete, the mixture was allowed to stand for 48 hours at room temperature. After neutralizing the potassium hydroxide and filtering to remove the salts, the product, n-decyl ether of 3-hydroxy thiolane-1,1-dioxide, was purified.

The n-decyl ether of 3-hydroxy thiolane-1,1-dioxide obtained as described in the foregoing was utilized as a toxic in a mineral oil fly spray, both with and without the addition of pyrethrum. In a conventional Peet-Grady test it proved to have good knock-down properties and exceptional killing properties.

A few drops of a solution of n-decyl ether of 3-hydroxy thiolane-1,1-dioxide in odorless base kerosene was placed on filter paper and exposed to strong sunlight and air. The liquid evaporated leaving substantially no stain behind. The experiment was repeated using amyl ether of $\beta$-thiol tetramethylene sulfone as the added toxicant. This solution as well left substantially no stain. This property is important in household insecticides and the like where absence of stain is highly desirable.

In the following table the results of using the compounds of our invention as solubilizers for derris resins are set out. For such purposes, it is preferable to use the cyclic sulfone derivatives having a terminal hydrocarbon chain of at least 8 carbon atoms or other suitable oleophilic group. Solutions of derris resins (30%—35% rotenone) at various concentrations were mixed with various amounts of odorless kerosene or light-medium spray oil having an unsulfonatable residue of 92% and allowed to stand for several days, the precipitation or lack of it being noted.

*Table I*

| Test No. | Solubilizer compound | Gms. solubilizer | Gms. derris resins | Gms. kerosene | Gms. spray oil | Remarks |
|---|---|---|---|---|---|---|
| 1 | Methyl ether of 3-hydroxy thiolane-1, 1-dioxide. | 10 | 1 | | | Resins soluble in the ether, but solution not completely miscible with kerosene. |
| 2 | Nonenyl ether of 3-hydroxy thiolane-1, 1-dioxide. | 10 | 0.1 | 90 | | Do. |
| 3 | Decyl ether of 3-hydroxy thiolane-1, 1-dioxide. | 10 | 0.1 | 90 | | Solution clear after standing 7 days at room temperature. |
| 4 | $C_{12}$ ether of 3-hydroxy thiolane-1, 1-dioxide [1]. | 10 | 0.1 | 90 | | Do. |
| 5 | Decyl ether of 3-hydroxy thiolane-1, 1-dioxide. | 10 | 1 | 89 | | Very slight turbidity after 7 days at room temperature. |
| 6 | ...do... | 10 | 1.0 | | 89 | Solution clear after standing 20 days at room temperature. |
| 7 | ...do... | 10 | 1.5 | | 88.5 | Clear after 21 days. |
| 8 | ...do... | 10 | 2.0 | | 88.0 | Do. |

[1] This ether was obtained from the $C_{12}$ alcohol prepared from mesityl oxide polymer.

The present agents, either alone or in combination with other active or inactive substances, may be applied to plants, animals, fabrics and the like, by spraying, dusting, pouring, dipping, etc., in the form of concentrated liquids, solutions, aqueous emulsions, suspensions, dusting powders, and the like, containing such concentrations of the active principle as are most suited for the particular purpose at hand. They may be applied, for example, in the form of dilute solutions in a suitable solvent or mixture of solvents containing, for instance, water, acetone, petroleum distillates, lignite tar oils, hydrogenated hydrocarbons, paraffin oils, naphthenes, chlorinated hydrocarbons, chlorinated ethers, fenchyl alcohol, mono- and poly-hydric alcohols, glycol ethers, or the like, or mixtures thereof. As will be readily apparent, the particular choice of cyclic sulfone derivative and solvent, or solvent mixture, will depend considerably upon the particular use for which the material is intended.

For use in household insecticides the compounds are preferably dissolved in a light hydrocarbon oil, such as highly refined, odorless kerosene or kerosene distillate with or without the addition of other insecticides and sprays. Ordinarily from about .2% to 25% of our invented toxicants are used in such sprays.

Modified Peet-Grady tests were made with the present cyclic sulfone derivatives. The general test is fully described in the 1940 "Blue Book" published by the publisher of "Soap and sanitary chemicals" periodical on pages 193 to 197, as the large group method. Briefly the test as practiced consists of releasing 100 to 150 flies in an air conditioned cage 6 x 6 x 6 feet and spraying them with 6 ml. of insecticide. After 10 minutes exposure the number of flies which are incapacitated or "knocked down" is noted and all flies are transferred to a cage and allowed to recuperate in fresh air for 24 hours, when the dead flies are counted. For the purposes of this study the official Peet-Grady procedure was not followed in calculating the results, but only the percentages knocked down at 10 minutes and killed at 24 hours were recorded. The results obtained by testing pyrethrum and butadiene sulfone derivatives in the above manner are given in the following table:

mineral oil was found to be very effective when treated in the conventional manner as follows: Pure wool squares one by two inches were dipped in the mothproofing solution, were allowed to dry for a week, and then placed in covered petri dishes. Ten carpet beetle larvae (whose feeding is very similar to that of the common moth) were placed on each square and allowed to feed there for two weeks. Frass was then weighed. A square treated with the above solution of n-decyl ether of 3-hydroxy thiolane-1,1-dioxide yielded only 0.2 mg. of frass, whereas a blank square which was not dipped or was dipped in ineffective ingredients gave 14 mg. of frass.

The present agents may also be used as mosquito repellents or for killing mosquito larvae in water or for combating other pests such as fleas, bedbugs, bollweevils, cockroaches, water bugs, etc.

*Table II*

| Test No. | Butadiene sulfone derivative | Conc. of derivative gms./100 cc. base | Base | | Per cent knock down in 10 minutes | Per cent kill in 24 hours |
| --- | --- | --- | --- | --- | --- | --- |
| | | | Per cent by vol. of pyrethrum ext. | Per cent by vol. of odorless kerosene | | |
| 1 | n-Decyl ether of butadiene sulfone | 5 | 5 | 95 | 97 | 90 |
| 2 | do | 3 | 2 | 98 | 93 | 62 |
| 3 | Cetyl ether or butadiene sulfone | 5 | 5 | 95 | 92 | 60 |
| 4 | | | 5 | 95 | 80 | 28 |

For use on plants, our cyclic sulfone derivatives may be dissolved in a plant spray oil and emulsified in water to produce sprayable emulsions. The common emulsifying agents such as ordinary soaps, glycerol mono-oleate, salts or esters of sulfates and sulfonated animal, vegetable or mineral oils, Turkey red oil, saponified hydroxy ethylene sulfate, isopropyl naphthylene sulfonic acid, sulfonium sulfates, sulfated higher alcohols, caseinates, resinates, amine salts of higher fatty acids, sulfuric acid esters, starch, gum ghatti, gum tragacanth and the like may be ued in the combination of such sprays. The emulsifying agent, in many cases, may not only facilitate the formation of the emulsion, but also act as a spreading agent. In the same manner, the cyclic sulfone derivatives themselves without the addition of oil may be emulsified and used as plant spray insecticides.

The cyclic sulfone derivatives may be used either alone or in combination with other insecticides, fungicides, herbicides, rodenticides, or bactericides. Thus, for example, they may be combined with pyrethrum, derris resins, rotenone, nicotine, ammonium polysulfides, lime-sulfur, Bordeaux mixture, copper sulfate, copper carbonates, sulfur, mercury compounds, sodium arsenate, iron sulfate, phenol, para-dichlorobenzene, unsaturated chlorides, alkene sulfides, thiurum sulfides, organic thiocyanates such as thiocyano acetates, ether thiocyanates, and isothiocyanates and the like, to form pest-combating agents for numerous special purposes. A synergistic effect is obtained with many of these combinations, such as, for example, with cyclic sulfone ethers and ether thiocyanates.

Besides being useful in plant and fly sprays and dusts, the present compounds may be used for the protection of silk, cotton, wool as in clothing, blankets, etc., jute, burlap, strawboard, and like substances which are subject to attack by insects, such as moths, moth larvae, carpet beetle larvae, and the like. For example, a particular mothproofing composition of 2% of n-decyl ether of 3-hydroxy thiolane-1,1-dioxide disclosed in light The compounds of our invention may also be combined with finely divided materials such as diatomaceous earth, fuller's earth, ground rice chaff, activated bauxite, wood fiber, talc, clay, sulfur, activated charcoal, or carbon black and applied as dusting insecticides by hand or power driven dusting machines, hand bellows, or the like.

Other materials which may be employed in conjunction with the present active agents to produce pest-combating agents for various purposes are fixatives, such as casein, dextrum, gum karaya, gum arabic, gum dammar, locust bean flour, glue, gelatin, heavy petroleum oils, lanolin, resin waxes, and the like, and odorants such as isobornyl acetate, terpineol, d-pinene, d-camphene, sylvestrene, cedar oil, cypress oil, camphor oil and the like. For example, the present agents may be incorporated in the glue and sizing used in making books to combat silver fish.

We claim as our invention:

1. An insecticidal composition comprising a carrier and a compound of the formula

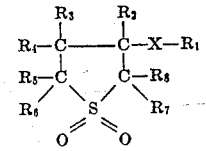

wherein X stands for a member of the group consisting of O and S, $R_1$ represents an organic radical, and $R_2$, $R_3$, $R_4$, $R_5$, $R_6$, $R_7$ and $R_8$ are each a member of the group consisting of a hydrogen atom, a halogen atom and an organic radical.

2. An insecticidal composition comprising a carrier and an organic ether of 3-hydroxy sulfolane.

3. An insecticidal composition comprising a carrier and an organic ether of 3-hydroxy sulfolane, the organic group having 5 to 20 carbon atoms.

4. An insecticidal composition comprising a carrier and an organic ester of 3-hydroxy sulfolane.

5. An insecticidal composition comprising a carrier and n-decyl ether of 3-hydroxy sulfolane.

6. A household insecticidal composition comprising odorless kerosene and a compound of the formula

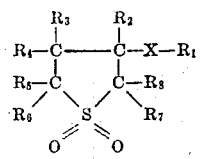

wherein X stands for a member of the group consisting of O and S, $R_1$ represents an organic radical, and $R_2$, $R_3$, $R_4$, $R_5$, $R_6$, $R_7$ and $R_8$ are each a member of the group consisting of a hydrogen atom, a halogen atom and an organic radical.

7. A household insecticidal composition comprising odorless kerosene and n-decyl ether of 3-hydroxy sulfolane.

8. A mothproofing solution comprising mineral oil and n-decyl ether of 3-hydroxy sulfolane.

9. An insecticidal composition comprising a mineral spray oil, a compound of the formula

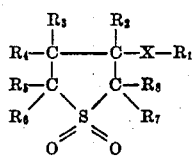

wherein X stands for a member of the group consisting of O and S, $R_1$ represents an organic radical, and $R_2$, $R_3$, $R_4$, $R_5$, $R_6$, $R_7$ and $R_8$ are each a member of the group consisting of a hydrogen atom, a halogen atom and an organic radical, and dissolved derris resin in excess of the amount normally soluble in the mineral spray oil.

10. An insecticidal composition comprising a carrier and an organic compound containing the sulfolane nucleus:

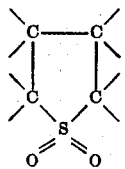

11. An insecticidal composition comprising a carrier and an organic compound containing the nucleus

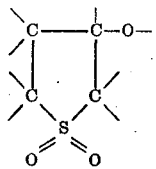

12. An insecticidal composition comprising a mineral oil and an organic compound containing the sulfolane nucleus

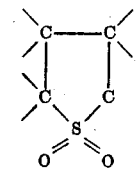

13. An insecticidal composition comprising a mineral oil, an organic compound containing the sulfolane nucleus

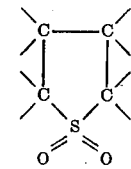

and a dissolved toxic plant extract in excess of the amount normally soluble in said mineral oil.

14. An insecticidal composition comprising a mineral oil, an organic compound containing the sulfolane nucleus

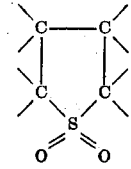

and a dissolved derris resin in excess of the amount normally soluble in the mineral oil.

RUPERT C. MORRIS.
EDWARD C. SHOKAL.
WILLIAM S. THORNHILL.